United States Patent
Dellock et al.

(10) Patent No.: US 11,931,945 B2
(45) Date of Patent: Mar. 19, 2024

(54) EXTRUDED SEALED FASTENER

(71) Applicant: Ford Global Technologies, LLC, Dearborn, MI (US)

(72) Inventors: Paul Kenneth Dellock, Northville, MI (US); Stuart C. Salter, White Lake, MI (US); David Brian Glickman, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 439 days.

(21) Appl. No.: 17/074,856

(22) Filed: Oct. 20, 2020

(65) Prior Publication Data
US 2022/0118668 A1    Apr. 21, 2022

(51) Int. Cl.
*B29C 48/12*    (2019.01)
*B29C 44/32*    (2006.01)
(Continued)

(52) U.S. Cl.
CPC ............ *B29C 48/12* (2019.02); *B29C 44/332* (2016.11); *B29C 48/0012* (2019.02); *B29C 48/0022* (2019.02); *B29C 48/155* (2019.02); *B29C 48/16* (2019.02); *B29C 48/885* (2019.02); *B29C 48/911* (2019.02); *F16B 2/22* (2013.01); *F16B 21/086* (2013.01); *B29K 2021/003* (2013.01);
(Continued)

(58) Field of Classification Search
CPC ............ B29C 48/0012; B29C 48/0013; B29C 48/0014; B29C 48/0016; B29C 48/0022; B29C 48/12; B29C 48/154; B29C 48/155; B29C 48/156; B29C 48/34; B29C 48/885; B29C 48/911; B29C 48/919; B29C 44/332; B29C 44/50; B29C 44/505; B29L 2031/727; B29L 2031/7282; B29K 2021/003; B29K 2075/00; F16B 2/22; F16B 21/086
See application file for complete search history.

(56) References Cited

U.S. PATENT DOCUMENTS

| | | | |
|---|---|---|---|
| 4,189,809 A | | 2/1980 | Sotos |
| 6,814,912 B2 * | | 11/2004 | Ausen ............... A44B 18/0065 264/211.17 |

(Continued)

FOREIGN PATENT DOCUMENTS

JP        H0295948        4/1990

*Primary Examiner* — Xiao S Zhao
*Assistant Examiner* — Joseph S Leyson
(74) *Attorney, Agent, or Firm* — Burris Law, PLLC

(57) ABSTRACT

A method of forming a plurality of fasteners includes extruding a continuous strip of material, the continuous strip defining a base portion, a tip portion, and a stem portion extending between the base portion and the tip portion. A portion of material is removed from the continuous strip of material along the tip portion such that a plurality of tip portions are separated from each other and spaced apart, each tip portion having at least one flexible tab. The continuous strip of material is then extruded through a foaming die, wherein the flexible tabs are elastically displaced away from the base portion during a foaming process such that a foam material fills a cavity of the foaming die to form a sealing element around the stem portion. Portions of the continuous strip between each of the tip portions are separated to produce a plurality of individual sealed fasteners.

13 Claims, 6 Drawing Sheets

(51) Int. Cl.
*B29C 48/00* (2019.01)
*B29C 48/155* (2019.01)
*B29C 48/16* (2019.01)
*B29C 48/88* (2019.01)
*B29C 48/885* (2019.01)
*F16B 2/22* (2006.01)
*F16B 21/08* (2006.01)
*B29K 21/00* (2006.01)
*B29K 75/00* (2006.01)
*B29K 77/00* (2006.01)
*B29L 31/00* (2006.01)

(52) U.S. Cl.
CPC ...... *B29K 2075/00* (2013.01); *B29K 2077/00* (2013.01); *B29L 2031/7282* (2013.01)

(56) References Cited

U.S. PATENT DOCUMENTS

| | | | |
|---|---|---|---|
| 7,067,185 B2 | 6/2006 | Ausen et al. | |
| 2004/0262853 A1* | 12/2004 | Larsen | B29C 48/605 |
| | | | 277/628 |
| 2019/0030776 A1 | 1/2019 | Schoonover et al. | |

* cited by examiner

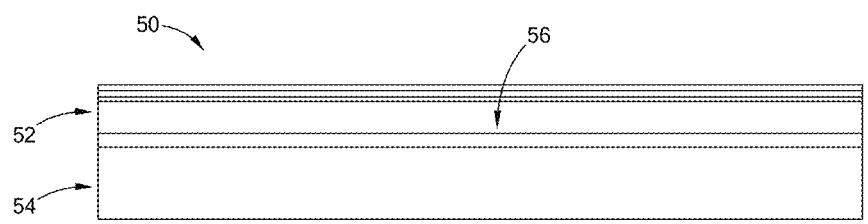
FIG. 3
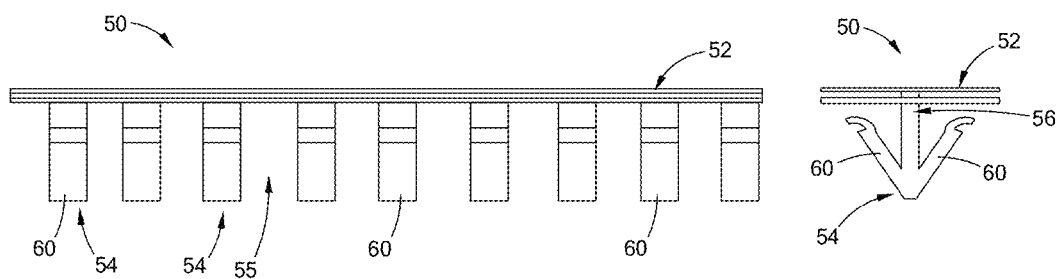
FIG. 4A
FIG. 4B

EXTRUDED SEALED FASTENER

FIELD

The present disclosure relates to mechanical fasteners, and more particularly to mechanical fasteners having a sealing element such as a washer to inhibit moisture intrusion into the parts being joined by the mechanical fasteners.

BACKGROUND

The statements in this section merely provide background information related to the present disclosure and may not constitute prior art.

In automotive vehicle applications, plastic clips or fasteners are widely used to attach door cladding, rocker moldings, and wheel lip moldings to their underlying structure. An individual automotive vehicle typically contains hundreds of plastic clips in a variety of locations throughout the vehicle. These plastic clips often include provisions to seal an interface between the plastic clip and the parts being secured together, such as a foam die-cut "doughnut" placed around the outer periphery of the plastic clip. The foam doughnut is manually installed over the plastic clip, which adds to the installation costs of the plastic clips. The foam doughnuts further bring additional costs for their individual part manufacture and tracking.

These cost issues related to sealed plastic clips, among other issues related to manufacturing sealed fasteners, are addressed by the present disclosure.

SUMMARY

This section provides a general summary of the disclosure and is not a comprehensive disclosure of its full scope or all of its features.

In one form, a method of forming a plurality of fasteners includes: extruding a continuous strip of material, the continuous strip defining a base portion, a tip portion, and a stem portion extending between the base portion and the tip portion; removing a portion of material from the continuous strip of material along the tip portion such that a plurality of tip portions are separated from each other and spaced apart, each tip portion having at least one flexible tab; and extruding the continuous strip of material through a foaming die, wherein the flexible tabs are elastically displaced away from the base portion during a foaming process such that a foam material fills a cavity of the foaming die to form a sealing element around the stem portion.

In variations of this method, which may be implemented individually or in any combination: portions of the continuous strip are separated between each of the tip portions to produce a plurality of individual sealed fasteners; the continuous strip of material is cooled before removing a portion of material along the tip portion; the continuous strip of material is dried after the cooling; the plurality of flexible tabs are displaced away from the base portion sequentially along a longitudinal direction of the continuous strip of material; the plurality of tabs are displaced by a ramp feature of the foaming die; excess foam is removed from the continuous strip of material after the foaming process; the continuous strip of material is thermoplastic; the foam material is a thermoplastic elastomer (TPE) or a polyurethane; and a metered volume of the foam material and a foaming agent are injected through gates on opposite sides of the continuous strip of material around the stem portion.

In another form of the present disclosure, a method of forming a plurality of fasteners includes: extruding a continuous strip of material, the continuous strip defining a base portion, a tip portion, and a stem portion extending between the base portion and the tip portion; removing a portion of material from the continuous strip of material along the tip portion such that a plurality of tip portions are separated from each other and spaced apart, each tip portion having at least one flexible tab; extruding the continuous strip of material through a foaming die, wherein the flexible tabs are elastically displaced away from the base portion during a foaming process such that a foam material fills a cavity of the foaming die to form a sealing element around the stem portion; and separating portions of the continuous strip between each of the tip portions to produce a plurality of individual sealed fasteners.

In variations of this method, which may be implemented individually or in any combination: the plurality of flexible tabs are displaced away from the base portion sequentially along a longitudinal direction of the continuous strip of material; the plurality of tabs are displaced by a ramp feature of the foaming die; and a metered volume of the foam material and a foaming agent are injected through gates on opposite sides of the continuous strip of material around the stem portion.

In still another form of the present disclosure, a sealed fastener is formed by a process of: extruding a continuous strip of material, the continuous strip defining a base portion, a tip portion, and a stem portion extending between the base portion and the tip portion; removing a portion of material from the continuous strip of material along the tip portion such that a plurality of tip portions are separated from each other and spaced apart, each tip portion having at least one flexible tab; extruding the continuous strip of material through a foaming die, wherein the flexible tabs are elastically displaced away from the base portion during a foaming process such that a foam material fills a cavity of the foaming die to form a sealing element around the stem portion; and separating portions of the continuous strip between each of the tip portions to produce a plurality of individual sealed fasteners.

In variations of this sealed fastener, which may be implemented individually or in any combination: the continuous strip of material is thermoplastic; the foam material is a thermoplastic elastomer (TPE) or a polyurethane; each tip portion comprises two diametrically opposed tabs; the foam material extends completely around the stem portion; and each tip portion defines a V-shaped geometry.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 3 is a side view of a continuous strip of material extruded according to the teachings of the present disclosure;

FIG. 4A is a side view of the continuous strip of material of FIG. 3 after removing a portion of material from the continuous strip of material according to the teachings of the present disclosure;

FIG. 4B is an end view of the continuous strip of material of FIG. 4A;

Figure 1A:
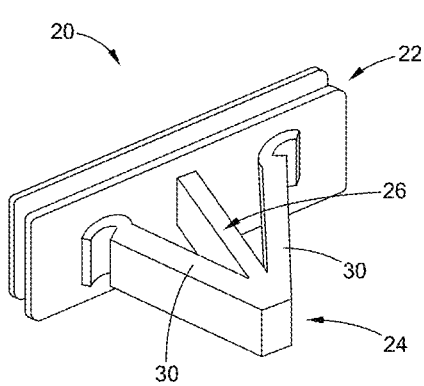
FIG. 1A is a perspective view of a fastener to which the teaching of the present disclosure are applied.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1B:
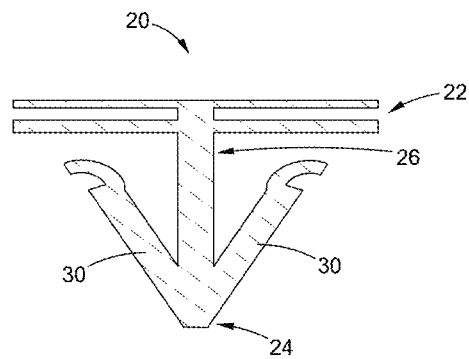
FIG. 1B is a cross-sectional view of the fastener of FIG. 1A.

Referring to FIGS. 1A and 1B, a fastener to which the teaching of the present disclosure are applied is generally referred to as reference numeral 20. The fastener 20 is used in a variety applications, including by way of example, automotive vehicles and fastening their parts such as door claddings, rocker moldings, and wheel lip moldings. As shown, the fastener 20 in one form comprises a base portion 22, a tip portion 24, and a stem portion 26 extending between the base portion 22 and the tip portion 24. As further shown, the fastener 20 comprises flexible tabs 30. Generally, the fastener 20 is a polymeric material such as a thermoplastic, and in one form nylon, however, a variety of materials (including polymers, metals, ceramics, and composites, among others) may be employed while remaining within the teachings of the present disclosure.

In one variation of the fastener 20, the tip portion 24 comprises two diametrically opposed flexible tabs 30 as shown. However, it should be understood that one or more tabs 30, which may extend partially around the stem portion 26 as shown, or completely around the stem portion 26 to form a single tab, should be construed as being within the scope of the present disclosure. Further, the fastener 20 defines a V-shaped geometry as shown. However, it should be understood that other geometries may be employed while remaining within the scope of the present disclosure.

Figure 2:
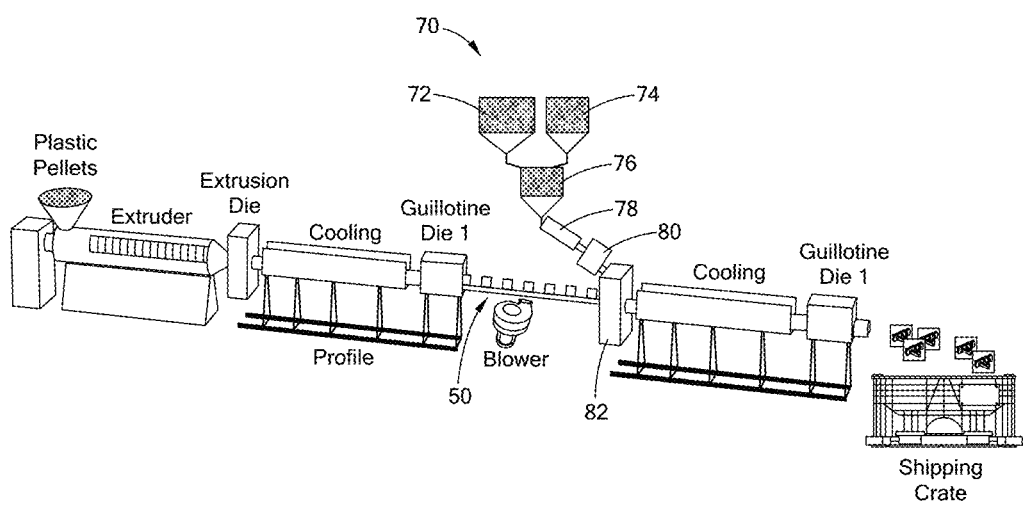
FIG. 2 is a perspective view illustrating a process for manufacturing sealed fasteners according to the teachings of the present disclosure.

Referring now to FIGS. 2 and 3, an innovative process to apply a sealing material around the stem portion 26 of the fastener 20, which in one form is a foam material, is illustrated. As shown, the process includes a method of forming a plurality of fasteners that first includes extruding a continuous strip of material 50. Similar to the fastener 20 illustrated above, the continuous strip of material 50 defines a base portion 52, a tip portion 54, and a stem portion 56 extending between the base portion 52 and the tip portion 54. After the continuous strip of material 50 exits the extrusion die of the extruder, the continuous strip of material 50 is optionally cooled. This cooling may be liquid (e.g., water) cooling, air cooling, or a combination thereof.

Next, and with specific reference to FIG. 4A, a portion of material from the continuous strip of material 50 is removed along the tip portion 54 such that a plurality of tip portions 53 are separated from each other and spaced apart, with gaps 55, while the base portion 52 retains its continuity along the continuous strip of material 50. As further shown, each tip portion 54 has at least one flexible tab 60, which is described in further detail below. Removal of the portion of material can be achieved by a variety of methods, including but not limited to a die cutter. After removing a portion of material as shown, the continuous strip of material 50 may optionally be dried before subsequent processing. The drying may be achieved, by way of example, through a blower or fan as shown.

Figure 5A:
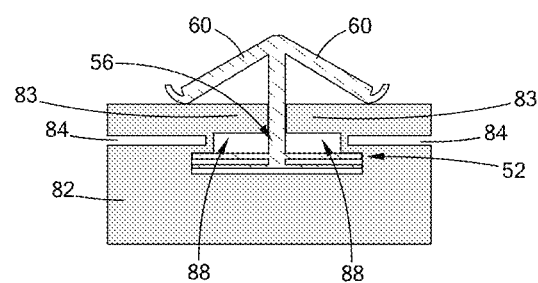
FIG. 5A is a cross-sectional view of the continuous strip of material of FIG. 4 in a foaming die, illustrating tabs of the continuous strip of material being displaced and a foam material filling a cavity of the foaming die according to the teachings of the present disclosure.
Figure 5B:
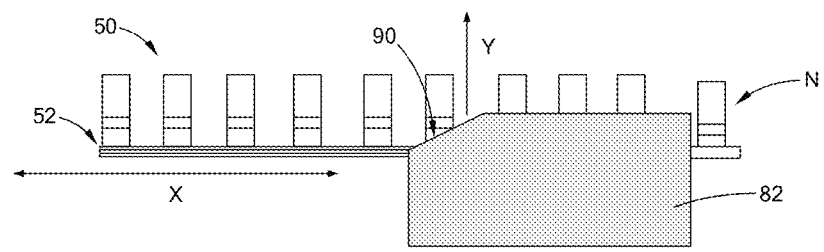
FIG. 5B is a side view of the continuous strip of material of FIG. 5A in the foaming die having a ramp feature according to the teachings of the present disclosure.

Referring to FIG. 2, and FIGS. 5A and 5B, the continuous strip of material 50 next passes through an innovative foaming system 70. The foaming system 70 comprises a supply of polymer material 72 (e.g. pellets) and a supply of foam material 74 (e.g., pellets), a mixer 76, an extruder 78, an optional metering device 80, and a foaming die 82. The polymer material 72 and the foam material 74 are mixed together in the mixer 76. In one form, the polymer material 72 is a thermoplastic, such as nylon, and the foam material 74 is a thermoplastic elastomer (TPE) such as a thermoplastic vulcanizate (TPV). The foam material 74 is mixed with a foaming agent, or alternately, mixed with $CO_2$ or nitrogen super critical fluid (SCF) to create the foam that is injected around the continuous strip of material 50.

The foaming die 82 includes gates 84 disposed on opposite sides of the base portion 52 of the continuous strip of material 50. The gates 84 direct the foam material 74 around the stem portion 56 of the continuous strip of material 50 during a foaming process. The foaming die 82 also includes a cavity 88, which is shaped to receive the foam material 74 and form a sealing element around the stem portion 56 of the continuous strip of material 50. In one form, a metered volume of foam material 74 and the foaming agent are injected through the gates 84 on opposite sides of the continuous strip of material 50 around the stem portion 56.

As further shown, the foaming die 82 is configured to elastically displace the flexible tabs 60 away from the base portion 52 during the foaming process such that a foam material 74 fills the cavity 88. In one form, the flexible tabs 60 are displaced away from the base portion 52 sequentially along a longitudinal direction X of the continuous strip of material 50 during the foaming process. This sequential displacement is achieved, in one form of the present disclosure, by a ramp feature 90 of the foaming die 82 as shown. Accordingly, as the continuous strip of material 50 is extruded through the foaming die 82, the flexible tabs 60 engage the ramp feature 90 and are successively elastically displaced, or deflected upwards along the direction Y, away from the base portion 52 to allow walls 83 of the die 82 to surround the stem portion 56 for injection of the foam material 74 into the die cavity 88. Accordingly, the foam material 74 fills the cavity 88, and the foam material 74 forms a sealing element around the stem portion 56. In one form, the foam material 74 extends completely around the stem portion 56. However, it should be understood that the foam material 74 may not completely encircle or extend completely around the stem portion 56 while remaining within the scope of the present disclosure.

After the foam material 74 is injected around the stem portions 56, the continuous strip of material 50 continues in the longitudinal direction X and eventually the tabs 60 move back and return to their nominal, undeflected positions as shown on the right-hand side of the die 82, indicated as position "N." After injection of the foam material 74, the continuous strip of material 50 is optionally cooled. This cooling may also be similar to the first cooling operation set forth above, namely, liquid (e.g., water) cooling, air cooling, or a combination thereof.

Figure 6A:
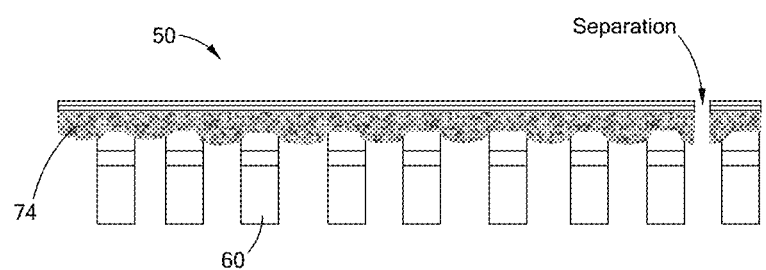
FIG. 6A is a side view of the continuous strip of material of FIG. 4 having a foam material forming a sealing element according to the teachings of the present disclosure.
Figure 6B:
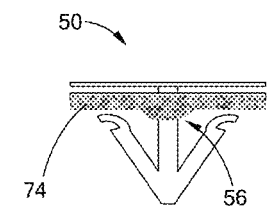
FIG. 6B is an end view of the continuous strip of material of FIG. 6A.

Referring to FIGS. 6A and 6B, the foam material 74 is disposed around the stem portion 56, in the shape of the cavity 88 of the foaming die 82, to form a sealing element along the continuous strip of material 50. Subsequently, portions of the continuous strip of material 50 are separated, in between the tabs 60, to produce a plurality of individual sealed fasteners. The separation may be achieved by a variety of methods, and in one form, the portions are separated by a moving guillotine die cutter. After separation, the plurality of individual sealed fasteners may be dropped into a container or crate for shipment.

Optionally, after the foaming process, excess foam may be removed from the continuous strip of material 50 before the portions are separated (not shown). This removal may include a variety of methods including, by way of example, abrasive brushes and compressed air, among others.

Figure 7:
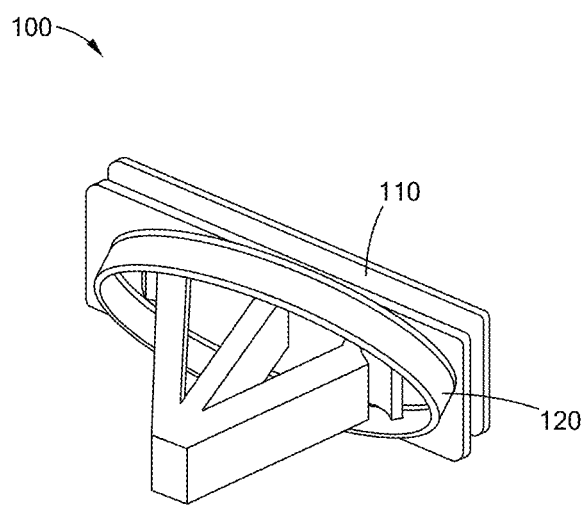
FIG. 7 is a perspective view of an individual sealed fastener formed according to the teachings of the present disclosure.

Referring to FIG. 7, an exemplary sealed fastener is illustrated and generally indicated by reference numeral 100. The sealed fastener 100 includes the fastener 110 and the sealing element 120. As previously set forth, it should be understood that this particular geometry is merely exemplary, and thus a variety of fastener 110 geometries as well as sealing element 120 geometries are contemplated to be within the scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of forming a plurality of fasteners, the method comprising:
    extruding a continuous strip of material, the continuous strip of material defining a base portion, a tip portion, and a stem portion extending between the base portion and the tip portion;
    removing a portion of material from the continuous strip of material along the tip portion such that a plurality of tip portions are separated from each other and spaced apart, each tip portion having at least one flexible tab; and
    extruding the continuous strip of material through a foaming die, wherein the flexible tabs are elastically displaced away from the base portion during a foaming process such that a foam material fills a cavity within the foaming die and forms a sealing element around the stem portion.

2. The method according to claim 1, further comprising cooling the continuous strip of material before removing the portion of material along the tip portion.

3. The method according to claim 2, further comprising drying the continuous strip of material after the cooling.

4. The method according to claim 1, wherein the flexible tabs are displaced away from the base portion sequentially along a longitudinal direction of the continuous strip of material.

5. The method according to claim 4, wherein the flexible tabs are displaced by a ramp feature of the foaming die.

6. The method according to claim 1, wherein excess foam is removed from the continuous strip of material after the foaming process.

7. The method according to claim 1, wherein the continuous strip of material is thermoplastic.

8. The method according to claim 1, wherein the foam material is a thermoplastic elastomer (TPE) or a polyurethane.

9. The method according to claim 1, wherein a metered volume of the foam material and a foaming agent are injected through gates on opposite sides of the continuous strip of material around the stem portion.

10. A method of forming a plurality of fasteners, the method comprising:
    extruding a continuous strip of material, the continuous strip defining a base portion, a tip portion, and a stem portion extending between the base portion and the tip portion;
    removing a portion of material from the continuous strip of material along the tip portion such that a plurality of tip portions are separated from each other and spaced apart, each tip portion having at least one flexible tab;
    extruding the continuous strip of material through a foaming die, wherein the flexible tabs are elastically displaced away from the base portion during a foaming process such that a foam material fills a cavity of the foaming die and forms a sealing element around the stem portion; and
    separating portions of the continuous strip between each of the tip portions to produce a plurality of individual sealed fasteners.

11. The method according to claim 10, wherein the flexible tabs are displaced away from the base portion sequentially along a longitudinal direction of the continuous strip of material.

12. The method according to claim 11, wherein the flexible tabs are displaced by a ramp feature of the foaming die.

13. The method according to claim 10, wherein a metered volume of the foam material and a foaming agent are injected through gates on opposite sides of the continuous strip of material around the stem portion.

* * * * *